United States Patent
Tanaka

(10) Patent No.: US 8,374,749 B2
(45) Date of Patent: Feb. 12, 2013

(54) PARKING ASSIST SYSTEM

(75) Inventor: Yu Tanaka, Aichi-gun (JP)

(73) Assignee: Aisin Seiki Kabushiki Kaisha, Aichi (JP)

( * ) Notice: Subject to any disclaimer, the term of this patent is extended or adjusted under 35 U.S.C. 154(b) by 740 days.

(21) Appl. No.: 12/531,432

(22) PCT Filed: May 14, 2008

(86) PCT No.: PCT/JP2008/058872
§ 371 (c)(1),
(2), (4) Date: Sep. 15, 2009

(87) PCT Pub. No.: WO2008/140104
PCT Pub. Date: Nov. 20, 2008

(65) Prior Publication Data
US 2010/0049402 A1    Feb. 25, 2010

(30) Foreign Application Priority Data
May 16, 2007  (JP) ................................. 2007-130820

(51) Int. Cl.
B60W 30/06    (2006.01)
(52) U.S. Cl. ........................................... 701/41; 701/36
(58) Field of Classification Search .............. 701/41–44, 701/36; 340/932.2, 425.5
See application file for complete search history.

(56) References Cited

U.S. PATENT DOCUMENTS

| | | | |
|---|---|---|---|
| 7,486,203 B2 | 2/2009 | Tanaka et al. | |
| 7,706,944 B2 | 4/2010 | Tanaka et al. | |
| 2006/0136109 A1 | 6/2006 | Tanaka et al. | |
| 2007/0146165 A1 | 6/2007 | Tanaka | |
| 2010/0079307 A1 | 4/2010 | Tanaka et al. | |

FOREIGN PATENT DOCUMENTS

| | | | |
|---|---|---|---|
| CN | 1793785 A | | 6/2006 |
| EP | 1050866 A1 | * | 11/2000 |
| JP | 06-111198 A | | 4/1994 |
| JP | 10-244890 A | | 9/1998 |
| JP | 2000-079860 A | | 3/2000 |
| JP | 2000-123297 A | | 4/2000 |
| JP | 2002-172989 A | | 6/2002 |
| JP | 2005-290813 A | | 10/2005 |

(Continued)

OTHER PUBLICATIONS

Translation of the International Preliminary Report on Patentability dated Dec. 3, 2009 (6 pages).

(Continued)

Primary Examiner — Yonel Beaulieu
(74) Attorney, Agent, or Firm — Sughrue Mion, PLLC

(57) ABSTRACT

The parking assist system assists the maneuvering for moving a vehicle to a reverse start position, then moving it in reverse from the reverse start position to a predetermined parking position in a manner as follows. A parking target setting section sets a parking target position corresponding to the predetermined parking position, based upon a parking reference detected based on image data captured from the scene around the vehicle. A parking path calculating section sequentially calculates a parking path from a present position of the vehicle to the parking target position, in the course of forward movement along a forward path. A parking path determining section determines whether an effective parking path has been established or not, based upon result of calculation by the parking path calculating section.

10 Claims, 11 Drawing Sheets

FOREIGN PATENT DOCUMENTS

| | | |
|---|---|---|
| JP | 2005-313710 A | 11/2005 |
| JP | 2006-175918 A | 7/2006 |

OTHER PUBLICATIONS

Chinese Office Action dated Apr. 8, 2011 in corresponding Chinese Application No. 20080008797.2.

International Search Report for International Application No. PCT/JP2008/058872 dated Jun. 24, 2008.

Korean Office Action issued in Korean Application No. 10-2009-7019305, dated Aug. 19, 2011.

Japanese Office Action issued in Japanese Application No. 2007-130820 dated May 24, 2012.

* cited by examiner (a) (b)

PARKING ASSIST SYSTEM

TECHNICAL FIELD

The present invention relates to a parking assist system for assisting a maneuvering operation in which a vehicle is maneuvered forward to a reverse start potion (a shift-lever switching position for the driver to switch the position of the shift lever into reverse) for parking the vehicle during its forward maneuvering, then the vehicle is maneuvered reverse from this reverse start position to be parked at a predetermined parking position.

BACKGROUND ART

A parking operation for parking a vehicle generally involves steering and reverse maneuvering in a small space, thus requiring relatively high maneuvering skill. Then, in order to alleviate the trouble for the diver during parking operation, various types of parking assist systems and maneuvering assist systems have been proposed. Patent Document 1 identified below discloses an invention relating to a parking assist system for assisting a maneuvering operation including a forward movement to a reverse start position and subsequent reverse movement with steering to park the vehicle at a predetermined parking position.

A driver of a vehicle mounting this parking assist system, in order to confirm an empty parking space, stops the vehicle temporarily at a position where the driver can see this parking space substantially directly laterally from the driver's seat. After this temporary stop, the driver maneuvers the vehicle forward, along an arcuate path toward the reverse start position. Being "triggered" by this temporary stop, the parking assist system calculates a moving amount of the vehicle moved forward toward the reverse start position. Then, the driver stops the vehicle at a position when the driver determines, by visual estimation, the vehicle has reached a position where the turning of the vehicle is possible enough. Then, the driver switches the shift lever into reverse. Upon detection of completion of this switching of the shift lever, the parking assist system calculates a parking target position and a guiding path. More particularly, the system effects image recognition of a white line(s) indicative of the parking space and then determines the parking target position, based upon the result of this recognition. The system then calculates the guiding path, based upon this parking target position and the position of the vehicle stopped at the reverse start position.
Patent Document 1: Japanese Patent Application "Kokai" No. 2006-175918 (see paragraphs Nos. 38-51, etc.)

DISCLOSURE OF THE INVENTION

[Drawback to be Solved by Invention]

This parking assist system is superior in the precision in setting the parking target position and superior also in the setting speed, thus allowing reduction in the driver's trouble in setting the parking target position. However, as the stop position used as the reverse start position is at the driver's discretion, the position is not necessarily appropriate. For instance, if the vehicle was stopped after a more than necessary amount of forward movement and/or steering amount, the period required for the subsequent reverse movement to the parking target position will be longer disadvantageously. Conversely, if the forward movement amount and/or steering amount was (were) insufficient, no guiding path can be set at all, so that it can become needed for the driver to operate the shift lever back into reverse and then move the vehicle forward again. As these situations result in disadvantageous prolongation of the time required for parking, there is a need for a more effective parking assist system.

The present invention has been made to address to the above-described drawback. The principal object of the invention is to provide a parking assist system which allows setting of a parking target position and a guiding path for parking with high precision and in a shorter period of time, thus allowing further reduction in the trouble for the driver in parking.

[Means To Accomplish Object]

For accomplishing the above-noted object, a parking assist system relating to the present invention is provided for assisting a parking operation of a vehicle including forward movement to a reverse start position and subsequent reverse movement from the reverse start position to park the vehicle at a predetermined parking position. The system has characterizing features as follows.

According to the characterizing feature of the present invention, the system comprises:

an image receiving section for obtaining image data captured by an image capturing device mounted on the vehicle from a scene around the vehicle;

a parking reference detecting section for detecting, based on said image data, a parking reference for use in parking the vehicle;

a parking target setting section for setting, based on said parking reference, a parking target position corresponding to said predetermined parking position;

a parking path calculating section for successively calculating a parking path from a current position of the vehicle to said parking target position, based on said parking target positions which are set in repetition based upon said parking references detected repeatedly during the forward movement of the vehicle to said reverse start position; and a parking path determining section for determining whether the parking path has been established effective or not, based upon the result of the calculation by said parking path calculating section.

With this characterizing feature, in the course of the forward movement, a position where the parking path is established effective can be used as to the reverse start position. Therefore, the reverse start position will not be too far from the parking target position and can be set at an appropriate position. Further, in case no parking path has been established effective, the forward movement can be continued. So, a position where no effective parking path is established cannot be used as the reverse start position inappropriately.

As a result, it has become possible to provide a parking assist system which allows setting of a parking target position and a guiding path for parking with high precision and in a shorter period of time, thus allowing further reduction in the trouble for the driver in parking.

According to a further feature of the parking assist system relating to the present invention, said parking path calculating section calculates said parking path, each time the vehicle has moved forward by a predetermined distance.

With this characterizing feature, with each forward movement by the predetermined distance, that is, with a movement of the vehicle, the parking path is calculated. Therefore, it is possible to eliminate wasteful calculation. In general, the image recognition processing requires high processing load. So, with elimination of wasteful calculation, it becomes advantageously possible to restrict adverse effect to other processing and power consumption.

According a further feature of the parking assist system relating to the present invention, said parking path calculating section calculates said parking path, each time the vehicle has moved for an arc of a predetermined angle.

With this characterizing feature, with each movement for an arc of the predetermined angle, that is, with a movement of the vehicle, the parking path is calculated. Therefore, it is possible to eliminate wasteful calculation. In general, the image recognition processing requires high processing load. So, with elimination of wasteful calculation, it becomes advantageously possible to restrict adverse effect to other processing and power consumption.

According a further feature of the parking assist system relating to the present invention, the system further comprises an informing outputting section for informing result of determination when it is determined that the parking path has been established effective.

With informing of the determination result, the driver can stop the vehicle immediately. That is, the driver can stop the vehicle without maneuvering the vehicle forward for a long time from the position of establishment of the effective parking path. As a result, an appropriate position can be set as the reverse start position. Further, as the driver will continue the forward movement of the vehicle until being informed, the vehicle is not sopped at a position where no effective parking path can be established yet.

According a further feature of the parking assist system relating to the present invention, said parking reference comprises a parking space delimiting line.

In general, in a parking area including a plurality of parking spaces delimited from each other, the road surface thereof has a dark color due to e.g. asphalt pavement, whereas the parking space delimiting lines have a light color such as white, yellow, etc. Therefore, there is a high contrast, so that the parking space delimiting lines can be readily identified by image recognition technique. With detection of such parking space delimiting line, accurate setting of the parking target position is made possible.

According to a still further characterizing feature of the present invention, the parking assist system of the invention further comprises:

an image outputting section for outputting an output image including the scene around the vehicle superposed at least with said parking target position to a display device provided in the interior of the vehicle; and an instruction input receiving section for receiving an instruction by the driver of the vehicle.

And, said parking target setting section adjusts said parking target position, based upon an instruction inputted by the driver according to said output image.

The parking target position set based upon the parking reference detected from the image data can sometimes suffer from deviation. Further, even when this position is set at a precise position, the driver may sometimes desire to keep a larger space on the side of the driver's seat or on the side of the passenger's seat, etc. According to the above characterizing feature, the parking target position is adjusted, based upon input of the driver's instruction. Therefore, the feature allows parking assistance with higher precision and convenience.

According to a still further characterizing feature of the parking assist system relating to the present invention, the system further comprises a guiding section for guiding the reverse movement of the vehicle from said reverse start position to said parking target position along said parking path.

Compared with a maneuvering operation for forward movement, a maneuvering operation for reverse movement requires higher skill. Therefore, if the reverse movement from the reverse start position to the parking target position is assisted by the guiding section, this will significantly alleviate the maneuvering difficulty for the driver. Also, as the parking path from the reverse start position to the parking target position has already been calculated, at the time of setting of the reverse start position, this guidance can be effected speedily.

According to a still further characterizing feature of the parking assist system relating to the present invention, said guiding section guides the vehicle by an automatic steering control.

If the guidance of reverse movement is effected by automatic steering control, this will even further alleviate the driver's difficulty. As described above, the parking path from the reverse start position to the parking target position has already been calculated, at the time of setting of the reverse start position. Therefore, the guidance by this automatic steering control too can be effected speedily.

BEST MODE OF EMBODYING THE INVENTION

[First Embodiment]

Next, embodiments of the present invention will be explained with reference to the accompanying drawings.

In the first embodiment, explanation will be given by way of an example of a parking assist system implementing automatic steering control.

Figure 1:
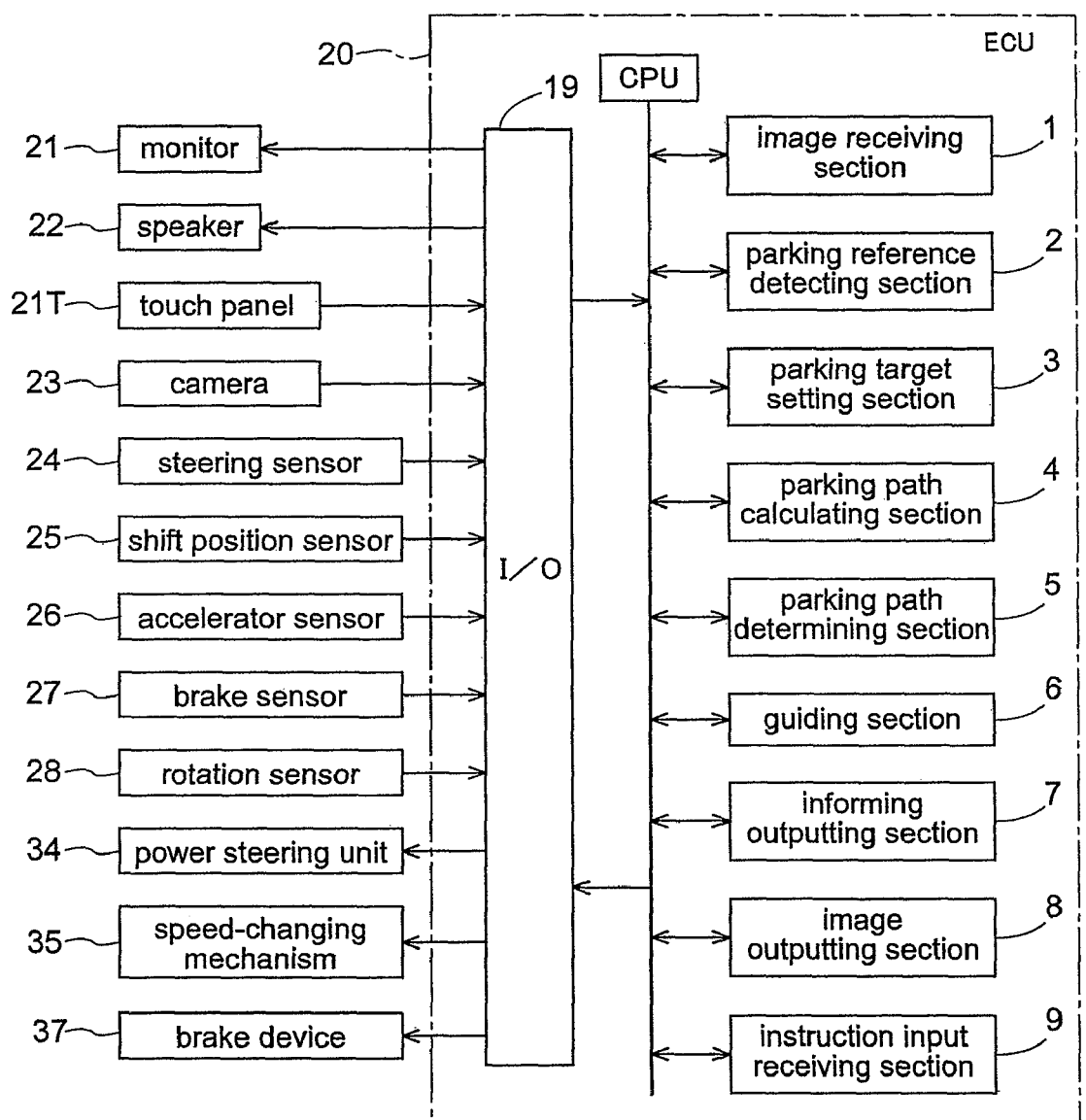
FIG. 1 is a block diagram schematically showing an example of construction of a parking assist system of the present invention.

FIG. 1 is a block diagram schematically showing an example of construction of a parking assist system of the present invention.

Figure 2:
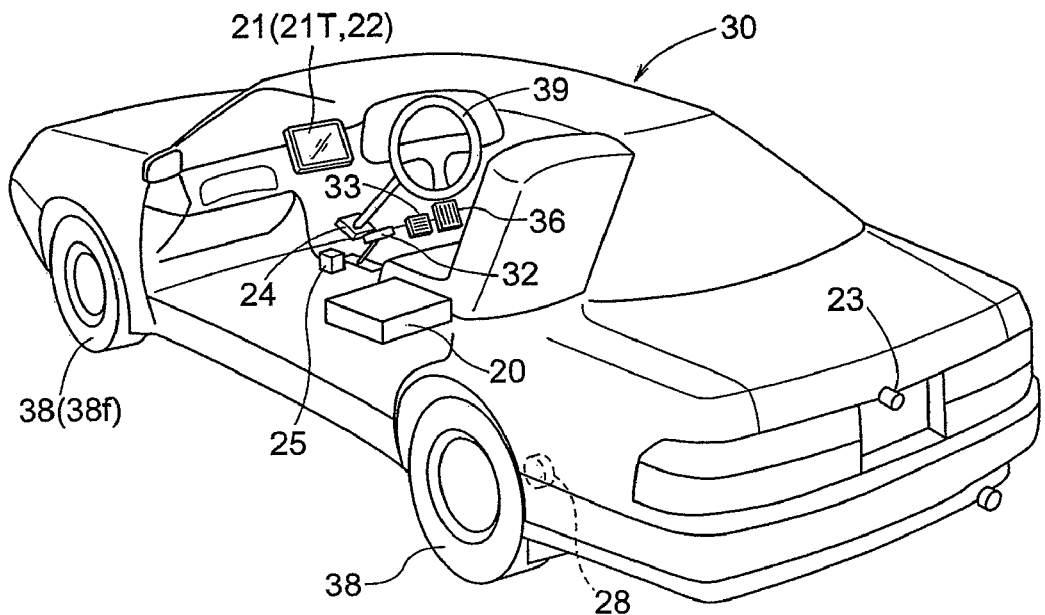
FIG. 2 is a perspective view showing an example of a vehicle mounting the parking assist system shown in FIG. 1.

FIG. 2 is a perspective view showing an example of a vehicle 30 mounting the parking assist system of the invention.

Figure 3:
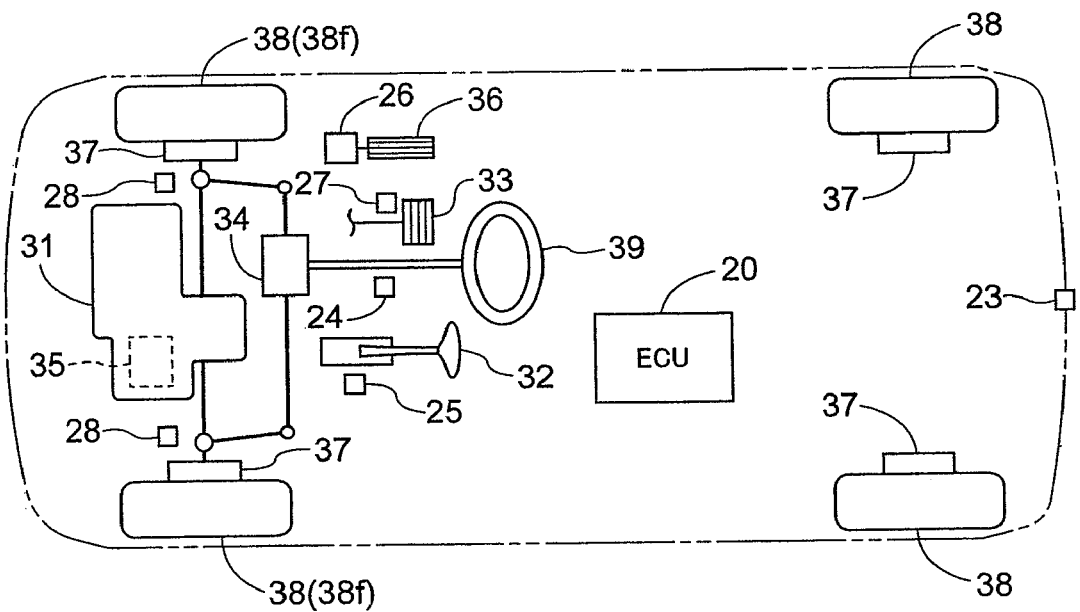
FIG. 3 is a block diagram schematically showing an example of construction of the vehicle shown in FIG. 2.

FIG. 3 is a block diagram schematically showing an example of construction of the vehicle 30.

The parking assist system of the invention comprises an ECU 20 as the core component thereof. The ECU 20 includes an input/output interface 19 for effecting inputs/outputs of information and includes also a microprocessor and a DSP (digital signal processor) for processing information from this input/output interface. Needless to say, the input/output interface 19 can be partially or entirely incorporated within such processor. The ECU 20 comprises an electronic circuitry having the microprocessor as the core component thereof. The ECU 20 further includes a storage device comprised of a memory, a resistor, etc. incorporated within the processor or provided as separate components.

At an upper position on a console provided nearby a driver's seat, there is mounted a monitor 21 having a touch panel 21T on its display screen. The monitor 21 is a liquid-crystal type monitor having backlight. Needless to say, this can be a plasma display type, a CRT type, etc, instead. The touch panel 21T can be a pressure-sensitive type or an electrostatic type and outputs a position touched by e.g. a finger as location data. This monitor 21 includes a speaker 22. Incidentally, the speaker 22 can alternatively be mounted at a different place such as inside a door. Preferably, the monitor 21 is used also as a display device for a navigation system.

In the instant embodiment, as an image capturing device for capturing an image of scene around the vehicle, a camera 23 is mounted at the rear end of the vehicle 30. This camera 23 is a digital camera incorporating such image-capturing elements as a CCD (charged coupled device), CIS (CMOS image sensor), etc. and outputs captured information in real-time as time-series video information. Also, this camera 23 is a wide-angle camera and ensues a view angle in the horizontal direction ranging from 120 to 140 degrees. Further, the camera 23 is mounted with its optical axis having a depression angle of 30 degrees approximately, so that the camera can capture an image of an area extending for about 8 meters rearwardly of the vehicle 30.

Incidentally, in the present embodiment, the camera 23 for capturing image of the rear side of the vehicle was described as an example of the image capturing device. The invention is not limited thereto. Instead, a camera for capturing image of the forward side of the vehicle 30 or two cameras for capturing images of the forward side and the rear side can be used. Further, on the forward side and on opposed lateral sides of the vehicle 30, two cameras may be used for capturing images of forward lateral sides.

The vehicle 30 mounts various kinds of sensors for detecting the maneuvering conditions and moving conditions of the vehicle 30.

The operating line for a steering wheel 39 includes a steering sensor 24 for determining a direction and an amount of steering operation of the steering wheel 39. The steering wheel 39 is operably coupled to a power steering unit 34 for power-assisting steering by transmitting rotational operating force to front wheels 38f. Therefore, based upon determination result of the steering sensor 24, the steering direction and steering amount of the vehicle 30 can be detected.

The operating line for a shift lever 32 includes a shift position sensor 25 for determining a shift position. The shift lever 32 is operably coupled to a speed-changing mechanism 35 having a torque converter or CVT (continuously variable transmission), etc. for speeding-changing power from an engine 31 mounted at a front portion of the vehicle body and transmitting this speed-changed power to wheels 38. In the case of the present embodiment, the shift position sensor 25 can be a switch which detects whether the shift lever 32 has been set to reverse or not.

The operating line for an accelerator pedal 36 for controlling traveling speed includes an accelerator sensor 26 for determining an operation amount. The operating line for a brake pedal 33 to be actuated for causing a brake device 37 for the wheels 38 to apply a braking force thereto includes a brake sensor 27 for detecting e.g. presence/absence of braking operation.

Further, as a moving distance sensor of the vehicle 30, there is provided a rotation sensor 28 for determining a rotational amount of at least either front wheels or rear wheels. Needless to say, the moving amount of the vehicle 30 can alternatively be determined in the speed changing mechanism 35, based upon a rotational amount of a maneuvering line.

As shown in FIG. 1, the parking assist system includes various functional sections, i.e. an image receiving section 1, a parking reference detecting section 2, a parking target setting section 3, a parking path calculating section 4, a parking path determining section 5, a guiding section 6, an informing outputting section 7, an image outputting section 8, an instruction input receiving section 9. The connections of these respective functional sections are done via the input/output interface 19.

These connections are done via e.g. data buses, address buses, control busses, a memory inside or outside the microprocessor, etc. As described above, the ECU 20 includes storage means such as a memory, a disc device (hard disc, optical, magnetic, magneto-optical), etc. For instance, for temporary storage of a program to be executed by the microprocessor, obtained image data, etc., the internal or external memory, the disc device is/are used. Such connections as above are known in the art. So, for the simplicity of explanation, detailed description and illustration thereof will be omitted.

First, general constructions of these functional sections will be explained. Before doing this, however, there will be explained a maneuvering operation assisted by the inventive parking assist system. The parking assist system of the invention has the function of assisting a driver's maneuvering operation for parking the vehicle 30 to a predetermined parking position. Here, this maneuvering operation involves forward maneuvering to a reverse start position and subsequent reverse maneuvering from this reverse start position to the parking target position.

Figure 4:
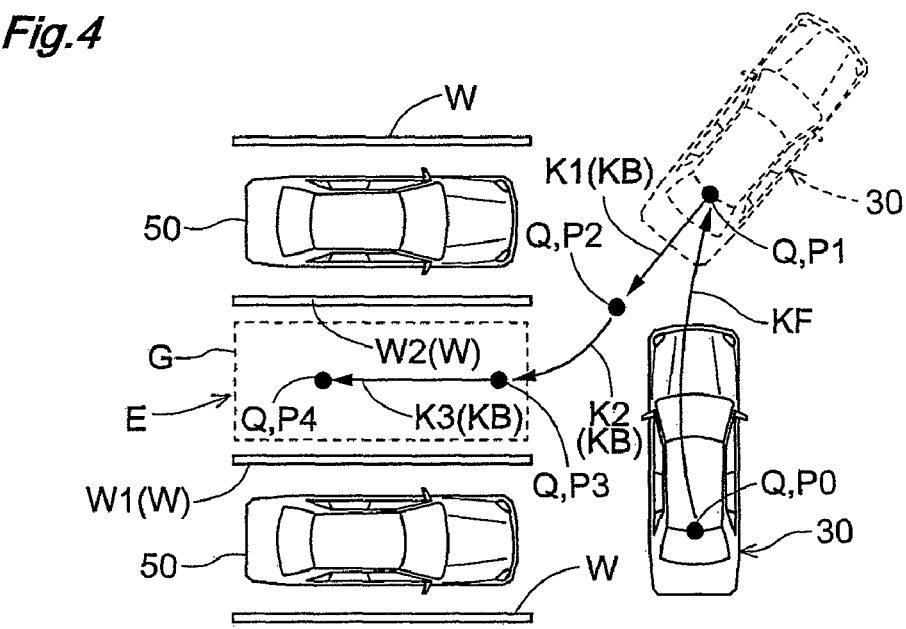
FIG. 4 is an explanatory view showing an example of maneuvering operation of the vehicle at the time of garage (vertical) parking.

For instance, as illustrated in FIG. 4, the above-described maneuvering operation comprises e.g. a maneuvering operation for effecting garage parking, with the predetermined parking position being an empty parking space between parked other vehicles 50. In this embodiment, the other vehicles 50 are shown for identifying the predetermined parking position. Needless to say, however, the other vehicles 50 may be non-existent. Incidentally, a parking space E is a space delimited by delimiting lines W (parking space delimiting lines) provided on the road surface. A quadrangle G denoted by dot line in the figure is the parking target area set within the parking space E (see also FIGS. 5 and 6 to be described later).

In FIG. 4, a point Q represents a predetermined position for the vehicle 30, and points P1 through P4 represent positions (coordinate positions) of this point Q in the horizontal plane (on the road surface) (see also FIGS. 5 and 6 to be described later). In the case of the garage parking of this example, the vehicle 30 is to move forward along a forward path KF to a reverse start potion P1, along an arcuate moving path by a right-hand steering (first steering direction). Then, from the reverse start position P1 along an arcuate path with a left-hand steering (second steering direction), the vehicle is to move in reverse along a parking path KB (K1, K2, K3) to be parked in the predetermined parking space E (predetermined parking position). Here, there is shown an example in which the parking path KB is further divided into straight reverse path sections K1 and K3 and a reverse path section K2 moving in reverse along the arcuate path by the left-hand steering (second steering direction). However, this is only an example. The parking path can be variably set as desired.

Figure 5:
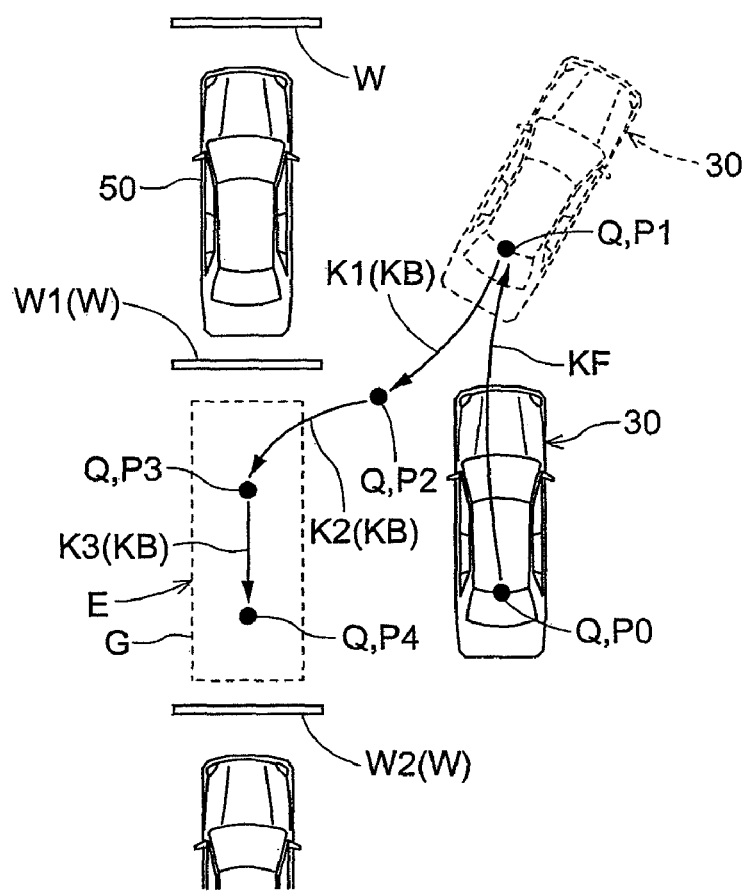
FIG. 5 is an explanatory view showing an example of maneuvering operation of the vehicle at the time of parallel parking.

Further, a parallel parking shown in FIG. 5 also is understood o correspond to the above-described maneuvering operation. In this case of parallel parking, the vehicle 30 moves forward along a forward path KF to a reverse start position P1 along an arcuate path by a right-hand steering (first steering direction). Then, from this reverse start position P1, along an arcuate path by a left-hand steering (second steering direction), the vehicle moves in reverse along parking path KB (K1, K2, K3) to be parked in the predetermined parking space E (predetermined parking position) Like the garage parking described above, here, there is shown an example where the parking path KB is divided into three kinds of path sections, specifically, a reverse path section K1 moving in reverse along the arcuate path by the left-hand steering (second steering direction), a reverse path section K2 moving in reverse along the arcuate path by the right-hand steering (third steering direction) and the straight reverse path section K3. However, this also is just an example. The parking path can be variably set as desired.

Figure 6:
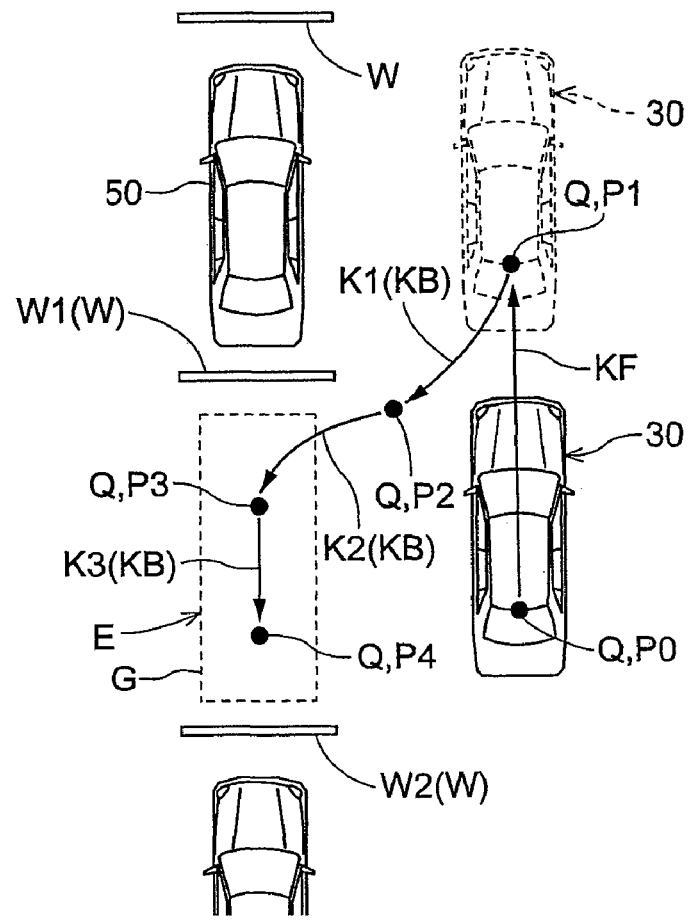
FIG. 6 is an explanatory view showing another example of maneuvering operation of the vehicle at the time of parallel parking.

In the above, as the first steering direction, if the steering angle is set to the neutral position, this will result in a parallel parking as illustrated in FIG. 6. That is, the vehicle will move forward along the forward path KF to the reverse start position along the moving path of zero steering angle to the right direction (first steering direction) relative to the predetermined parking space E. Then, from the reverse start position P1, the vehicle will move in reverse along the parking path KB (K1, K2, K3) with the arcuate path by the steering to the left (second steering direction) to be parked at the predetermined parking space E (predetermined parking position).

Next, the general constructions of the above-described respective functional sections will be discussed.

The image receiving section 1 is a functional section for obtaining image data captured by the camera 23 (image capturing device) mounted on the vehicle 30 from the scene around the vehicle 30.

The parking reference detecting section 2 is a functional section for detecting, based on the obtained image date, a parking reference (e.g. delimiting line W) for use in parking the vehicle 30. The parking reference detecting section 2 repeatedly detects the parking reference in the course of forward movement to the reverse start position P1.

The parking target setting section 3 is a functional section for setting, based upon the detected delimiting line W (parking reference), a parking target position P4 (parking target area G) corresponding to the predetermined parking position (e.g. the parking space E). This parking target setting section 3 repeatedly sets the parking target position P4, based on the detected parking reference, in the course of the forward movement to the reverse start position P1.

The parking path calculating section 4 is a functional section for sequentially calculating a parking path (path KB) from the present position Q of the vehicle 30 to the parking target position P4, based upon the parking target position P4 repeatedly set based upon the repeatedly detected parking reference, in the course of the forward movement to the reverse start position P1. That is, this is a functional section for sequentially calculating the parking path (path KB) from the present position Q of the vehicle 30 to the parking target position P4, in the course of the forward movement along the forward path KF with the arcuate moving path.

The parking path determining section 5 is a functional section for determining whether an effective parking path KB has been established or not, based upon the result of the calculation by the parking path calculating section 4.

The guiding section 6 is a functional section for guiding the reverse movement of the vehicle 30 from the reverse start position P1 along the established effective parking path KB to the parking target position P. This guidance includes both a guidance by the automatic steering control and a guidance for assisting the steering by the driver with using a voice or a guideline shown on the monitor 21. In this first embodiment, the control by the automatic steering control will be explained. The mode of guidance using the guideline will be explained later in a second embodiment.

The informing outputting section 7 is a functional section for informing the result of determination to the driver via informing means, if establishment of effective parking path KB was determined while the vehicle 30 was moving along the forward path KF. Here, the informing means can be e.g. the monitor 21, and/or the speaker 22.

The image outputting section 8 is a functional section for outputting to the monitor 21, the image of scene captured by the camera 23 with the parking space E or the parking target area G being superposed thereon. In case the guiding section 6 guides reverse movement of the vehicle 30 with using the guideline, the necessary guideline too will be outputted in superposition.

The instruction input receiving section 9 is a functional section for receiving instruction inputs from the driver, such as instructions for start of parking assistance, its completion, parking mode (garage parking, parallel parking, right/left-hand parking direction), adjustment of parking target area G. The driver (or passenger) can give the instruction inputs by using the touch panel 21T or other switches, etc. In this embodiment, there will be explained a case where the instruction inputs are given with using the touch panel 21T.

Next, the specific procedure of the parking assistance effected by the functional sections generally described above will be described in details. As described above, in the instant embodiment, by image processing based on the image data captured by the camera 23, the delimiting lines W are detected as the parking reference and the parking target position P4 is set. Also, by the various kinds of sensors, the moving amount of the vehicle 30 is calculated. Before detailed discussion of the respective functional sections, the basic principle of the image processing and the principle of the moving amount calculation will be explained first.

Figure 7:
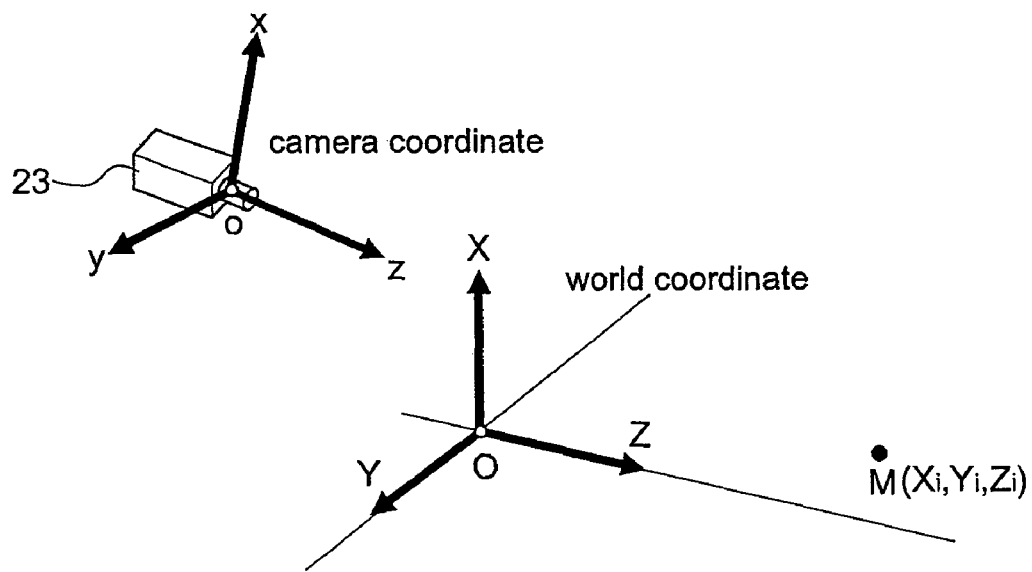
FIG. 7 is an explanatory view showing relationship between the world coordinate and camera coordinate.
Figure 8:
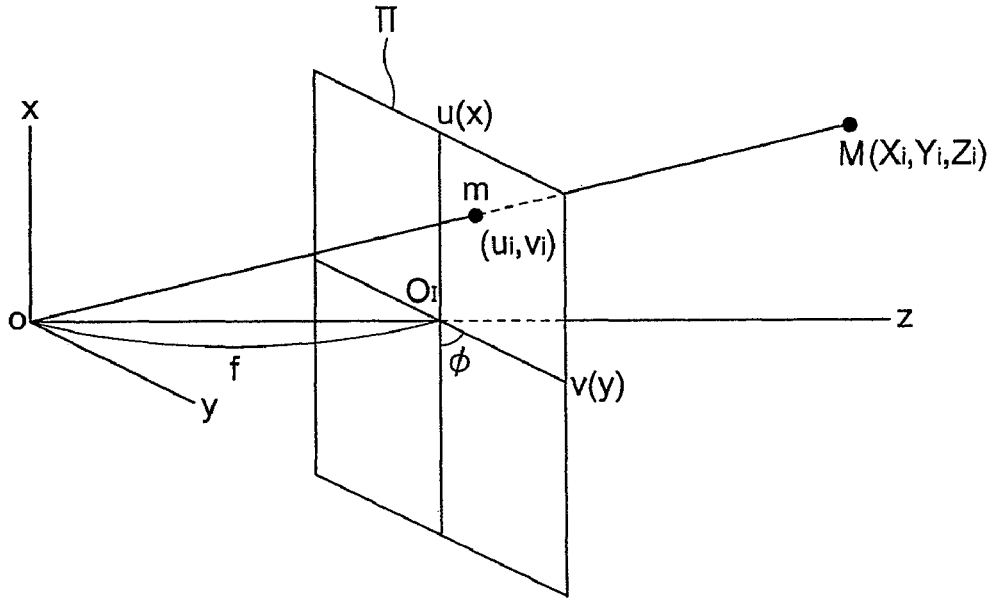
FIG. 8 is an explanatory view showing relationship between the world coordinate and image coordinate of captured image.

FIG. 7 is an explanatory view showing relationship between the world coordinate (X, Y, Z) and the camera coordinate (x, y, z). FIG. 8 is an explanatory view showing relationship between the camera coordinate (x, y, z) and the image coordinate (u, v) of the captured image. In this example, both the world coordinate and the camera coordinate are "right-hand coordinates". Here, the term "right-hand coordinate" refers to a method of obtaining X (x), Y(y), Z(z), according to the order of opening the thumb, index finger and the middle finger of a right hand.

As shown in FIG. 7, the vehicle 30 and arbitrary point M in the three-dimensional space (e.g. the parking target position P4, etc.) are arranged in the coordinate system defined by the world coordinate (X, Y, Z) having an origin (O). Here, the Y-Z plane in the world coordinate is assumed as the horizontal road surface. The camera 23 is mounted with having a translational component and a rotational component in the world coordinate. That is, there exists a camera coordinate (x, y, z) having a translational component and a rotational component relative to the world coordinate and having an origin (o).

The image coordinate (u, v) is a plane Π (image plane) extending perpendicular to the z axis coincident with the optical axis of the camera coordinate, as shown in FIG. 8 and it is a two-dimensional coordinate system distant from the origin (o) of the camera coordinate along the z axis direction by the focal length (f) of the camera. The point of intersection between the image plane and the optical axis is the image center OI. Ideally, the u axis of the image coordinate extends parallel with the x axis of the camera coordinate and the y axis extends parallel with the y axis of the camera coordinate. The mark φ in the figure denotes the angle formed between the u axis and the y axis. Here, since the image coordinate (u,v) is an orthogonal coordinate, this φ is 90 degrees.

As shown in FIG. 7, in case the coordinates of point M in the world coordinate are (Xi, Yi, Zi), the point M is represented by the following matrix expression (1) and its homogeneous coordinates are presented by the following matrix expression (2).

$$M = \begin{bmatrix} Xi \\ Yi \\ Zi \end{bmatrix} \quad (1)$$

$$\tilde{M} = \begin{bmatrix} Xi \\ Yi \\ Zi \\ 1 \end{bmatrix} \quad (2)$$

The point M is subjected to a coordinate conversion (transparent conversion, viewpoint conversion) represented by the following expression (3), by a transparent camera matrix expression, with a point (m) on the image plane Π.

$$\tilde{m} = P\tilde{M} \quad (3)$$

If the conversion matrix relating to the position between the camera coordinate and the world coordinate is a translational vector T (translational component), the conversion processing relating the posture is a rotational matrix R (rotational component), and a processing including internal parameters such as the focal distance (f) of the camera 23, the angle φ between the u-v axes, is a camera matrix A, then, the transparency camera matrix P can be represented by the following expression (4).

$$P = A[RT] \quad (4)$$

The transparent camera matrix A is comprised of a plurality of matrices. If generalized, this can be a projection camera matrix which is a matrix having 3 rows×4 columns.

The point M in the world coordinate is converted by the above expression (3) to a point (m) in the image coordinate and superposed by the image outputting section 8 onto the captured image captured by the camera 23. For instance, the coordinates of the parking target position P4 in the world coordinate can be derived from the points in the image coordinate.

Figure 9:
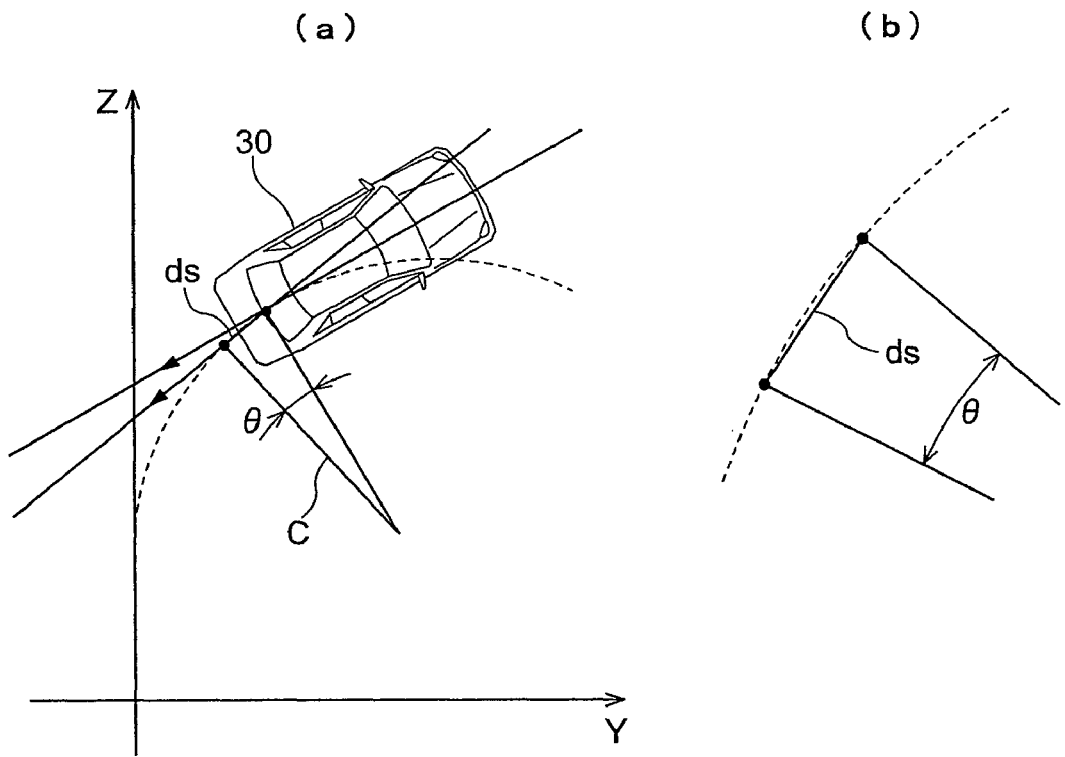
FIG. 9 is an explanatory view for explaining principle of calculating a moving amount of the vehicle.

Next, the calculating principle of moving amount of the vehicle 30 will be explained. FIG. 9 is a view illustrating the principle of calculating the moving amount of the vehicle 30. Here, the following explanation will be given, with the assumption of the vehicle 30 shown in FIG. 7 being present in the Y-Z plane (road surface) in the world coordinate.

The detection results obtained by the moving condition detecting sensors such as the steering sensor 24, the rotation sensor 28, etc. are inputted via the input/output interface to the respective functional sections of the ECU 20. Although the details will be given later, the parking path calculating section 4 and the guiding section 6 calculate the position change (moving amount) of the vehicle 30, based upon the detection results of the moving condition detecting sensors.

FIG. 9 shows the vehicle 30 moving in reverse along the arcuate path having a radius C. The broken line in the figure represents the arc of the radius C. FIG. 9(b) is a partially enlarge view of FIG. 9(a). The radius C can be obtained from the detection result of the steering sensor 24. The mark (ds) in the figure represents the minimal moving distance of the vehicle 30 in the minimal period. This minimal moving distance (ds) is obtained from the detection result of the rotation sensor 28. And, the moving amount of the vehicle 30 is calculated with using the mathematical expressions (5) through (7) as follows. The mark a in the expression represents the cumulative moving distance.

$$\theta = \int_0^a \frac{1}{C} \cdot ds \quad (5)$$

$$Y = \int_0^a \sin\theta \cdot ds \quad (6)$$

$$Z = \int_0^a \cos\theta \cdot ds \quad (7)$$

Next, with reference to the flowcharts shown in FIGS. 10-12, the operation of the parking assist system according to the present invention will be explained. Here, the following explanation will be given by way of an example of garage parking of the vehicle 30 to an empty parking space E as shown in FIG. 4.

Figure 10:
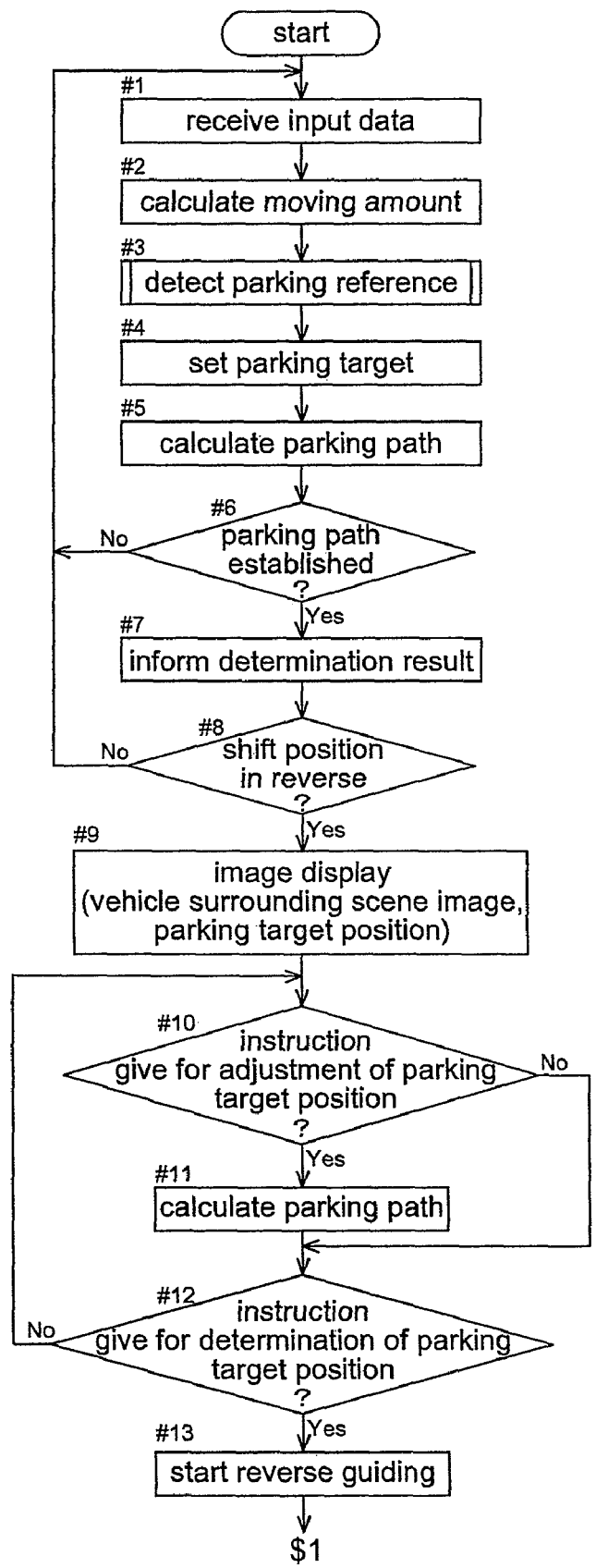
FIG. 10 is a flowchart illustrating operations of the parking assist system of the invention before a reverse start position.
Figure 11:
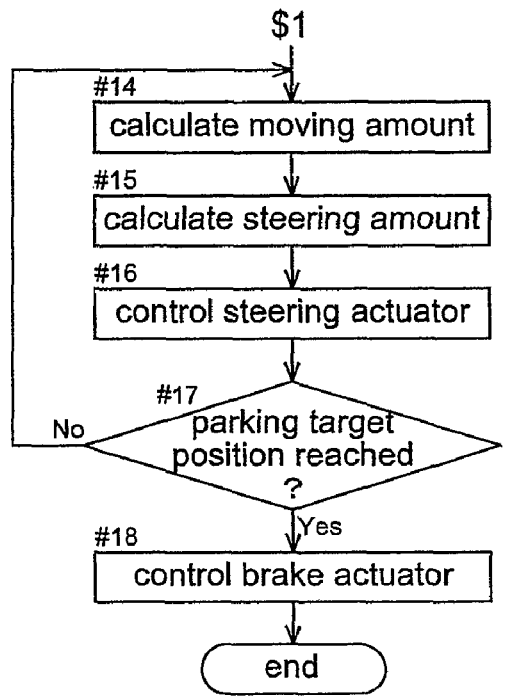
FIG. 11 is a flowchart illustrating operations of the parking assist system of the invention until a reverse start position to a parking target position, relating to a first embodiment.
Figure 12:
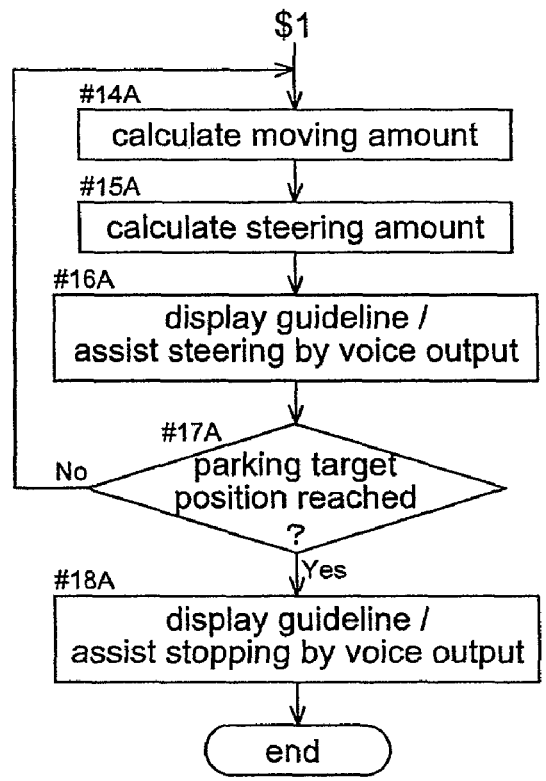
FIG. 12 is a flowchart illustrating operations of the parking assist system of the invention until a reverse start position to a parking target position, relating to a second embodiment.

Incidentally, FIG. 10 is a flowchart illustrating the operation to the reverse start position P1 and FIGS. 11 and 12 are flowcharts illustrating operations from the reverse start position P1 to the parking target position P4.

Further, FIG. 11 shows the operation according the first embodiment and FIG. 12 shows the operation according to the second embodiment to be described later.

[Parking Assistance Start Instructing Step]

A driver temporarily stops the vehicle 30 at a desired position (position P0 in FIG. 4) where the condition of the parking space E can be confirmed visually. And, the driver (passenger) operates the switch (not shown) or the touch panel 21T in the vehicle cabin to activate the parking assist system to start its parking assistance function. The input from the switch or the touch panel 21T as an instruction inputting section is inputted via the input/output interface 19 to the instruction input receiving section 9. Then, in accordance with the inputted instruction, the instruction input receiving section 9 causes the respective functional sections to start execution of the parking assist function.

Here, this start instruction for the parking assist function includes an instruction including a marking mode, such as garage parking, parallel parking, right or left-hand parking, etc. Incidentally, if the parking assist system can automatically identify the parking mode based upon the "behavior" of the vehicle 30 after the temporary stop, the instruction of parking mode can be omitted. Here, the language "behavior" refers to e.g. the steering direction, steering angle detected by the steering sensor 24. For instance, if the steering angle in a predetermined period after start of forward movement is equal to or greater than a predetermined angle, this can be determined as a garage parking as illustrated in FIG. 4. Whereas, if the angle is below the predetermined angle (including straight movement), then, this can be determined as a parallel parking as illustrated in FIG. 5 and FIG. 6.

[Image Receiving Step (FIG. 10, #1)]

After the driver temporarily stops the vehicle 30 and starts execution of the parking assistance function, the driver slowly releases the brake pedal 30 to cause the vehicle 30 to move forward.

The image receiving section 1 obtains image data of the scene around the vehicle 30 captured by the camera 23 mounted on the vehicle 30. The image receiving section 1 effects sync separation and A/D conversion on the image signals outputted from the camera 23 and obtains e.g. 30 frames of image data per second. Needless to say, depending on the image processing capacity of e.g. the parking reference detecting section 2, the predetermined interval of the image data sequentially obtained can vary appropriately, such as to 15 frames or 60 frames per second. The obtained image data are accumulated in the frame memory (not shown) of the ECU 20 to be read therefrom when needed for use.

[Moving Amount Calculating Step (FIG. 10, #2)]

Upon reception of the image data, the process calculates a moving amount of the vehicle from the position of the vehicle 30 in the previously received image data and the present position thereof. This calculation may be effected by a moving amount calculating section separately provided or by the parking path calculating section 4 or the guiding section 6

Incidentally, in the foregoing explanation with reference to FIG. 9, there was described the principle of calculating the moving amount, based upon the detection results of the steering sensor 24, the rotation sensor 28. Instead, the moving amount of the vehicle 30 may be calculated by recognizing the image of the particular point M (m) as shown in FIG. 7 and FIG. 8 and based upon this recognized image.

[Parking Reference Detecting Step (FIG. 10, #3)]

Figure 13:
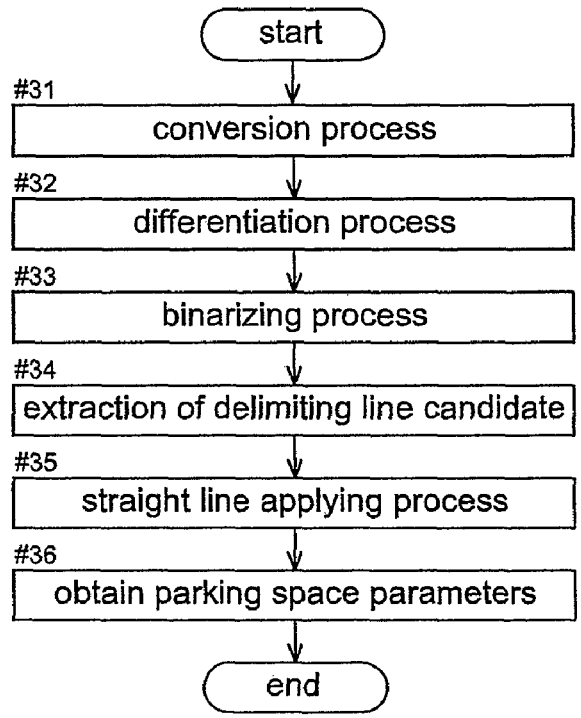
FIG. 13 is a flowchart illustrating an example of method of detecting a delimiting line.
Figure 14:
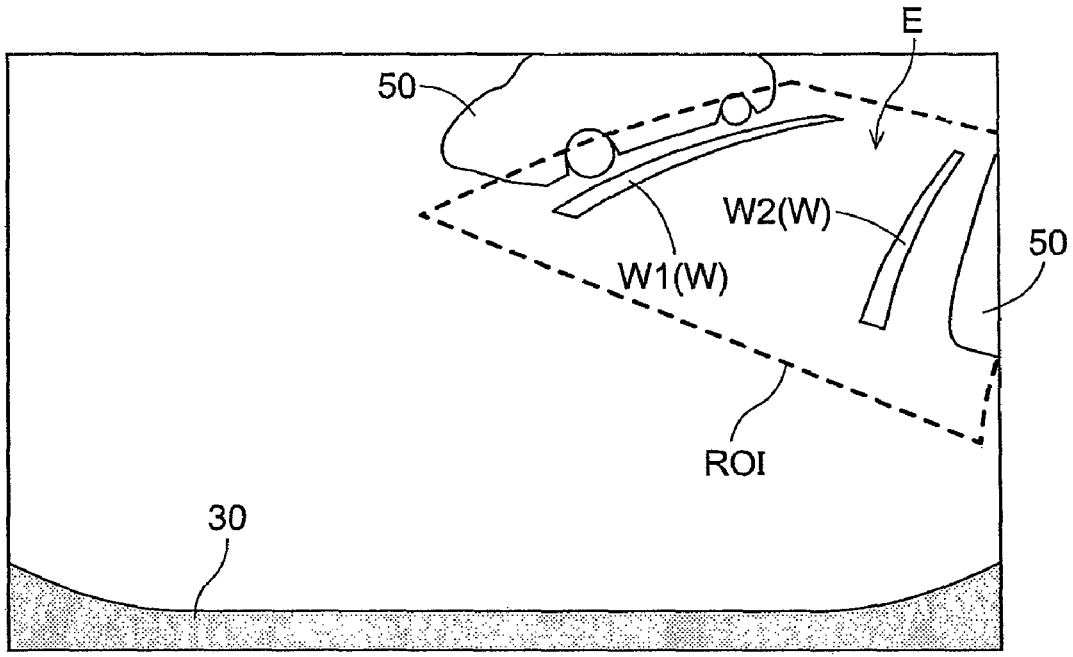
FIG. 14 is an explanation view illustrating a method of detecting a delimiting line from an image captured by a camera.

In this embodiment, the parking reference detecting section 2 detects the delimiting line W as the parking reference. FIG. 13 is a flowchart illustrating an example of a method of detecting the delimiting line W. FIG. 14 is an explanatory view illustrating a method of detecting the delimiting line W from image captured by the camera 23. As the vehicle 30 moves forward from the vehicle position P2 shown in FIG. 4 along an arcuate moving path by right-hand steering, the parking space E progressively enters the field of view of the camera 23. As this camera 23 is a wide-angle camera, the image captured thereby has some distortion in the perimeter thereof. And, the image data obtained by the image receiving section 1 comprise photographic data of three-dimensional space. Therefore, the parking reference detecting section 2 first effects a conversion process for correcting the distortion and also the above-described conversion process to the two-dimensional coordinate (FIG. 13, #31).

In general, in such parking place with delimited parking spaces, the road surface has a dark color due to asphalt pavement, whereas the delimiting lines W have a light color such as white, yellow. Hence, the parking reference detecting section 2 detects the delimiting line W by utilizing the brightness difference in the image data. More particularly, the section 2 causes e.g. a 3×3 spatial filter incorporating a known Gaussian filter to effect scanning, thereby differentiating the image data. With this differentiation, there are extracted a plus edge of dark-to-light brightness change and a minus edge of light-to-dark brightness change (FIG. 13, #32).

Incidentally, in the above, it is not needed to effect the differential operation over the entire range of the image data. Rather, it will be sufficient to effect the differential operation only on a predetermined region ROI (region of interest). The size of the parking space E is set within a certain area. Also, the position P0 where the vehicle 30 is stopped temporarily, is also confined within a certain fixed region, though depending on the individual driver. Therefore, as shown in FIG. 14, the recognition processing will be executed, including the differential operation, with using a region where the parking space is supposed to be present, as the region of interest ROI.

Further, as described above, the parking space E will be progressively included in the view field of the camera 23, as the vehicle 30 moves forward along the arcuate moving path by the right-hand steering from the vehicle position P0 in FIG. 4. Therefore, for a while after the start of forward movement of the vehicle 30, the parking space E will not be included in the field of view of the camera 23. As it is useless to effect the recognition operation of the delimiting line W under such condition, the recognition process is started, preferably, after the vehicle 30 has moved forward by a predetermined distance or has moved along the arcuate path by a predetermined angle.

Incidentally, in the present embodiment, the delimiting line W was described as an example of the parking reference. However, the invention is not limited thereto. A pole or wall face indicative of the parking space E can be used as the parking reference, instead.

Next, the parking reference detecting section 2 effects a binarizing operation for binarizing the differentiation result with setting a predetermined threshold value (FIG. 13, #33). As described above, the road surface has a dark color due to e.g. asphalt pavement and the delimiting line W has a light color such as white, yellow, etc., so there exists a significant brightness gradient across the edge of the delimiting line W. Hence, the differentiation result has a large absolute value also. So, by effecting the binarizing operation, the differential result of noise component other than that of the delimiting line W is eliminated. And, from the binarized points (pixels), the candidate points constituting the delimiting line W edge are extracted (#34). Generally, the delimiting line (W) is a straight line. Hence, the candidate points too will be present with a certain level of regularity. Then, based on this regularity, a straight-line applying operation is effected on the candidate points (#35). For this straight-line applying operation, e.g. the known Hough conversion can be utilized.

In this way, the delimiting lines W1 and W2 shown in FIG. 4 are detected. And, opposed terminal points of the detected delimiting lines W1, W2 are searched and then, by interconnecting these terminal points, the parking space E can be detected. In general, the parking space E is rectangular. So, by inspecting the "squareness" in the above, the detection precision of the parking space E can be enhanced. Through the above-described processes, there are obtained parking space parameters such as the position, length, terminal points of the delimiting line, the position, size of the parking space E, etc (#36).

Incidentally, in case the parking space E is not present within the image capturing range of the camera 23 as in the case of immediately after the forward movement of the vehicle 30, no delimiting line W is detected at all and no parking space parameters are detected, either.

[Parking Target Setting Step (FIG. 10, #4)]

Figure 15:
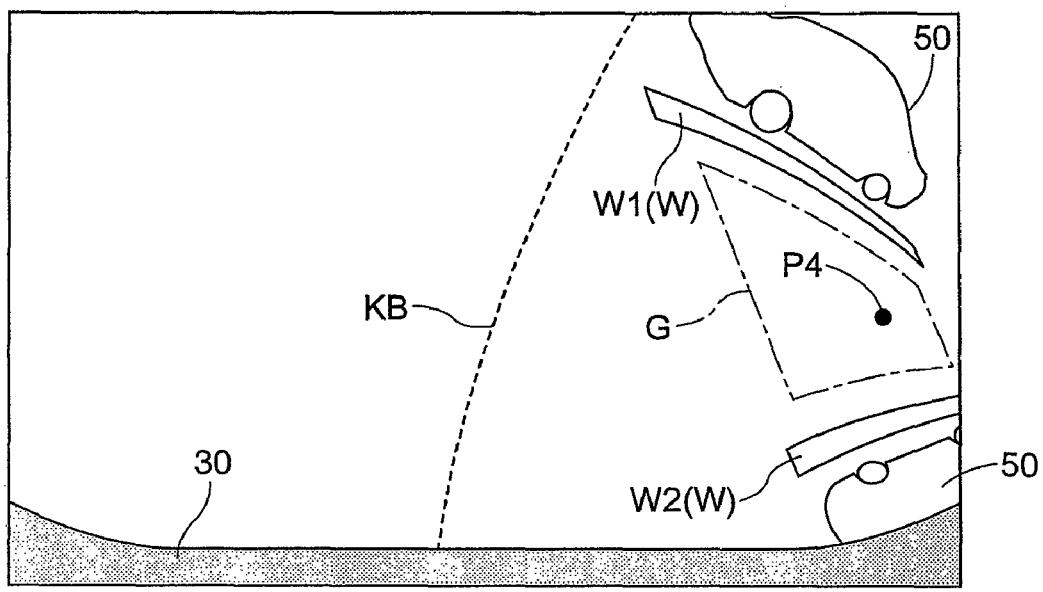
FIG. 15 is an explanatory view showing an example of calculation of a parking path.

After the parking space parameters on the parking space E have been obtained in the manner above, the parking target setting section 3 sets a parking target for this parking space E. More particularly, as shown in FIG. 15, a parking target area G will be set in a region within the parking space E in which the vehicle 30 can be confined. And, based upon the reference position Q of the vehicle 30 within this parking target are G, a parking target position P4 as the parking reference is set.

[Parking Path Calculating Step (FIG. 10, #5)]

The parking path calculating section 4 calculates the parking path KB for the reverse movement from the reverse start position P1, based on the moving amount calculated at the moving amount calculating step #2 and the parking target position P4. That is, with setting the present position of the vehicle 30 as a "provisional" reverse start position P1, a "provisional" parking path KB to the parking target position P4 is calculated. This parking path KB is calculated as a path in case the vehicle 30 is steered by a predetermined steering amount. In the case of the example shown in FIG. 15, the forward movement amount and the steering amount of the vehicle 30 are not sufficient, so this parking path KB has not reached yet the parking target position P4.

[Parking Path Determining Step (FIG. 10, #6)]

Figure 16:
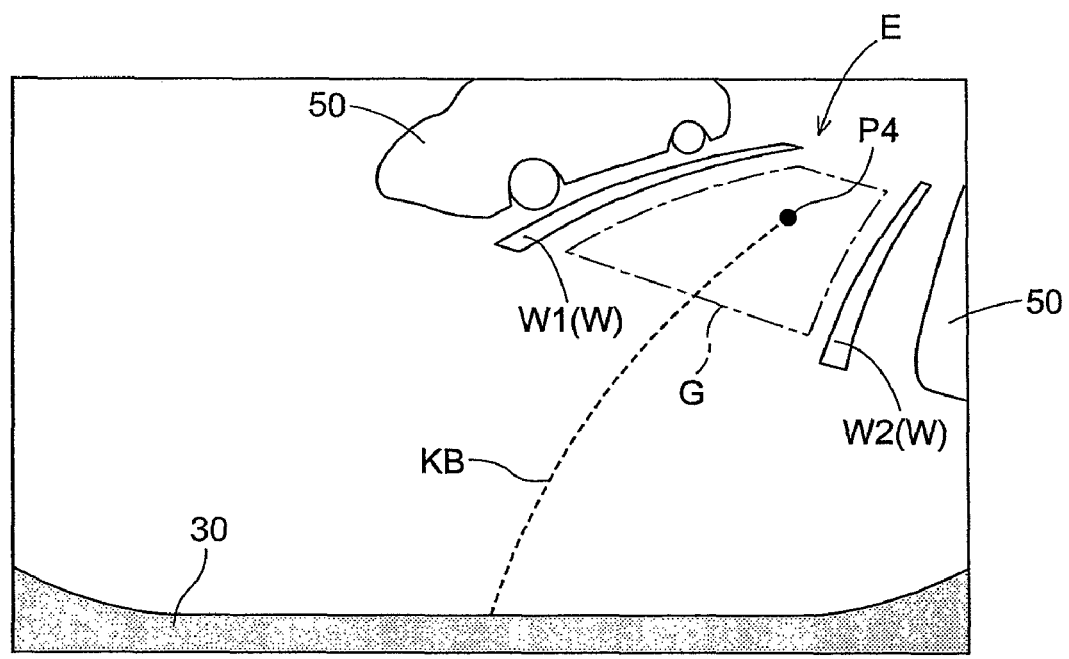
FIG. 16 is an explanatory view illustrating an example where a parking path that can be effectively established was calculated.

The parking path determining section 5 determines whether the provisional parking path KB calculated by the parking path calculating step 4 is to reach the parking target position 4 or not, that is, whether the provisional parking path can be established as an effective parking path or not. As shown in FIG. 15, if the parking path KB cannot be established effective, then, the process returns to step #1 and effects the setting of the parking target area G and the parking target position P4, on newly obtained image data. And, the process again effects the calculation of a provisional parking path KB and determines whether this further provisional parking path KB can be established effective or not. In this way, the calculation will be effected sequentially, and establishment of parking bath KB is determined in repetition. FIG. 16 shows an example where an effective parking path KB to the parking target position P4 has been established, as result of repeated calculations.

This repetition of calculations is effected by a predetermined time interval, for example. Instead, this may be effected each time the vehicle 30 has moved forward by a predetermined distance, irrespectively of such time interval. Some calculations will be effected uselessly if no change occurs in the position of the vehicle 30. However, if the calculation is effected for each forward movement by a predetermined distance as described above, this can ensure occurrence of a change in the position of the vehicle 30. Further, for the same reason, preferably, the calculation can be effected each time the vehicle 30 has moved along an arcuate path of a predetermined angle, i.e. each time there occurs a change in the posture of the vehicle 30.

[Informing Step (FIG. 10, #7)]

Upon establishment of effective parking path KB, the informing outputting section 7 informs through the speaker 22 the successful establishment of parking path KB.

For instance, the speaker 22 issues a voice message:

"Parking path successfully established. Please stop the vehicle and operate the shift lever into reverse."

Here, when the driver operates the shift lever 32 into reverse, the shift position sensor 25 detects this shift position and the process goes on to the next step (FIG. 10, #8). If the shift positions is not changed, then, the process returns to step #1 and repeats the operations of steps #1 through #8, with using newly obtained image data. However, it is also possible to arrange such that the process waits for change in the shift position without effecting calculations again, as long as stop of the vehicle 30 has been detected based on the detection results of the brake sensor 27 and the rotation sensor 28.

[Adjusting Step (FIG. 10, #9-#12)]

Figure 17:
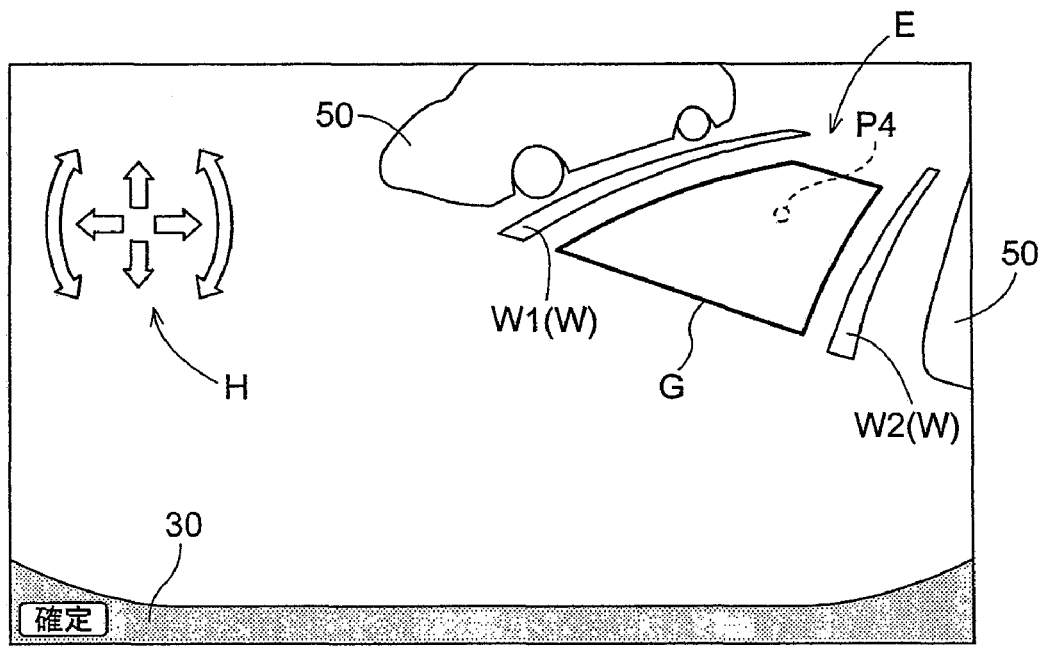
FIG. 17 is an explanatory view showing an example of a screen for adjusting parking target.

Once the shift lever 32 has been operated into reverse, the image outputting section 8, as shown in FIG. 17, causes the monitor 21 to show the captured image of the camera 23 with an indication (e.g. yellow) indicative of the parking target area G being superposed thereon (#9). With use of this indication of the parking target area G, the parking target position P4 can be made adjustable. As shown in FIG. 17, on the screen of the monitor 21, an arrow H for adjustment is shown in superposition. This arrow H is operably linked with the touch panel 21T, so that the position of the parking target area G can be adjusted with an operational instruction by the driver. This adjustment function is advantageous also for enhancement of the convenience for the driver, in addition to being useful in the case when the recognition precision of the delimiting lint W was not sufficient. For instance, in accordance with various desires such as a desire to keep larger space on the driver's side or the passenger's side or to keep large space on the rear side for putting in/out luggage, etc., the position of the parking target area G can be adjusted.

In case the adjustment of the parking target area G (parking target position P4) is possible, the process determines whether an instruction for adjustment has been given or not (#10). If an instruction has been given, then, the process effects re-calculation and determination of the parking path KB (#11).

Specifically, an operational instruction by the driver is transmitted via the input/output interface 19 to the image outputting section 8 and the parking target setting section 3. Then, the image outputting section 8 changes the contents of image display according to the operational instruction. In this, in order to indicate that the adjustment or the change is being made, the parking target area G can be indicated by a different kind or mode of indication, i.e. a yellow blinking, a red illumination, advantageously. Then, in accordance with the change of the parking target area G, the parking target setting section 3 changes the parking target position P4. The parking path calculating section 4 calculates a parking path KB to the changed parking target position P4 and the parking path determining section 5 determines whether the re-calculated parking path KB can be established effective or not. In this, if the parking path KB can be established effective, the indication of the parking target area G will return to the yellow illumination. Whereas, if the parking path KB cannot be established effect, e.g. a red illumination will be given and information will be given by a voice also. This information includes a message promoting a further forward movement of the vehicle 30, for example.

Incidentally, for the sake of simplicity, FIG. 10 omits illustrations of the operations for the change of the indication of parking target area G, determination, informing of determination result of parking path KB, etc. and shows only the "parking path calculation".

[Parking Target Fixing Step (FIG. 10, #12)]

In the case of absence of any instruction for adjustment of the parking target area G (parking target position P4) (#10) or in the case of successful establishment of effective parking path KB after an adjustment (#11), the informing outputting section 7 outputs a message urging the driver to input fixation (OK'ing) of the parking target area G (parking target position P4). Further, the image outputting section 8, as shown in FIG. 17, outputs to the monitor 21 a fixing button (OK button) for urging the driver to effect input fixation.

The informing outputting section 7, issues, through the speaker, a voice message:

"Please check the parking position shown in the screen and press "OK" button."

The operational input to the OK button is transmitted via the touch panel 21T, the input/output interface 19, to the instruction input receiving section 9. This instruction is transmitted also to the guiding section 6, and upon determination of presence of OK instruction (#12), the reverse guidance by the guiding section 6 is initiated as described below (#13).

[Reverse Guiding Step (Automatic Steering Step (FIG. 11)]

In this embodiment, there will be explained a case of the reverse guidance being effected by automatic steering control.

Through the speaker 22, the start of the guidance will be informed as:

"Please move the vehicle reverse by slowly releasing the brake pedal.".

When the driver slowly releases the brake pedal 33, the vehicle 30 starts moving in reverse by the creeping.

The guiding section 6, in order to move the vehicle 30 along the calculated parking path KB, calculates a moving amount (#14) and a steering amount (#15), based on the above-described expressions (5) through (7) and controls the steering actuator of the power steering unit 34 via the input/output interface 19 (#16). Thereafter, the operations of steps #14 through #16 will be effected in repetition, until arrival at the parking target position P4. Upon determination of arrival at the parking target position P4 (#17), the guiding section 6 controls the brake actuator for the braking device 37 to stop the vehicle 30, thus completing the parking guidance.

Incidentally, in FIG. 4, there are provided intermediate positions in the course of the parking path KB for the sake of convenience. However, it will not be problematic if the vehicle is automatically steered continuously without any stop, from the reverse start position P1 to the parking target position P4.

[Second Embodiment]

In the second embodiment, there will be described a case where the reverse movement along the parking path KB is effected by manual maneuvering by the driver. This second embodiment differs from the first embodiment described above in that the reverse guiding step is effected not by automatic steering control, but by manual maneuvering by the driver. In the other respects, the second embodiment does not differ from the first embodiment, therefore, the description thereof will be omitted and only the forward guiding step alone will be explained.

[Reverse Guiding Step (Steering Assisting Step (FIG. 12))]

Figure 18:
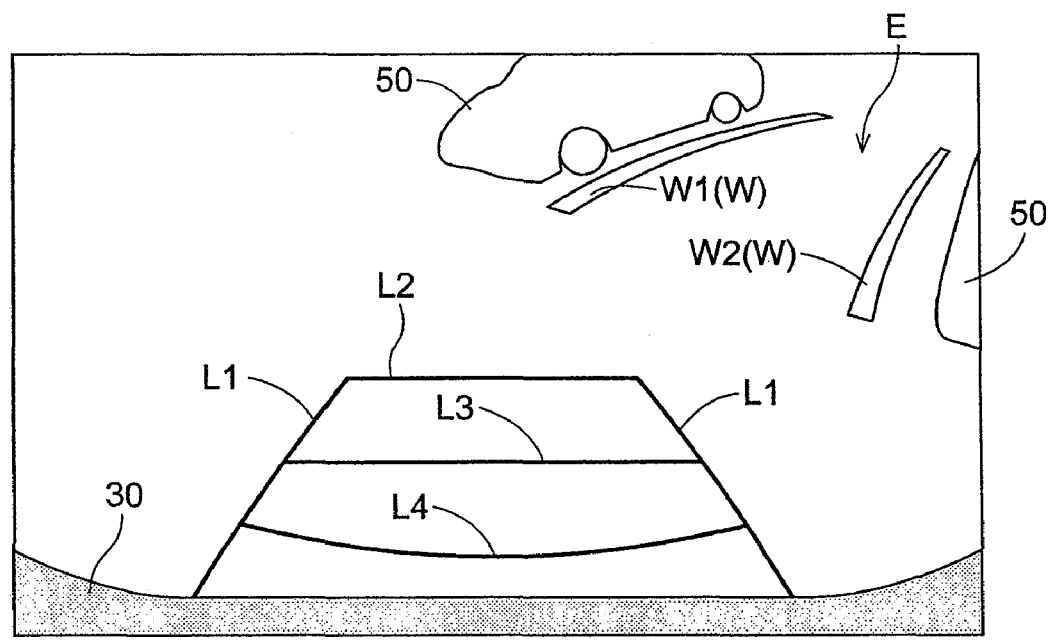
FIG. 18 is an explanatory view (1) showing an example of parking guidance using guidelines.

In the display screen of the monitor 21 shown in FIG. 17, once the position of the parking target area G (parking target position P4) has been fixedly determined (OK-ed), the guiding section 6 starts reverse guiding. FIG. 18 is an explanatory view showing an example of display screen of the monitor 21 after depression of the OK button. As shown in FIG. 18, by the image outputting section 8, guidelines L1-L4 are superposed on the captured image. In this example, the guideline L1 is a vehicle width extension line indicated in green, guideline L2 is a rear 5 meter target line indicated in green, guideline L3 is a rear 3 meter target line indicated in green and guideline L4 is a rear 1 meter alert line indicated in red, respectively. Incidentally, the parking target area G can be also superposed thereon, if appropriate.

With using these guidelines for reference, the driver effects maneuvering according to voice message issued from the speaker 22 and maneuvers the vehicle 30 in reverse toward the parking space E.

For instance, first, the guiding section 6, guides, through the speaker 22,

"Move vehicle straight in reverse until the guideline contacts the white line."

If this guidance is followed, the vehicle 30 will move in reverse from the reverse start position P1 to the first intermediate position P2 shown in FIG. 4 along the first path section K1 of the parking path KB.

When the vehicle 30 has reached the first intermediate position P2, the guiding section 6, guides, through the speaker 22, "Stop the vehicle once and then operate the steering wheel to the maximum left-hand."

Figure 19:
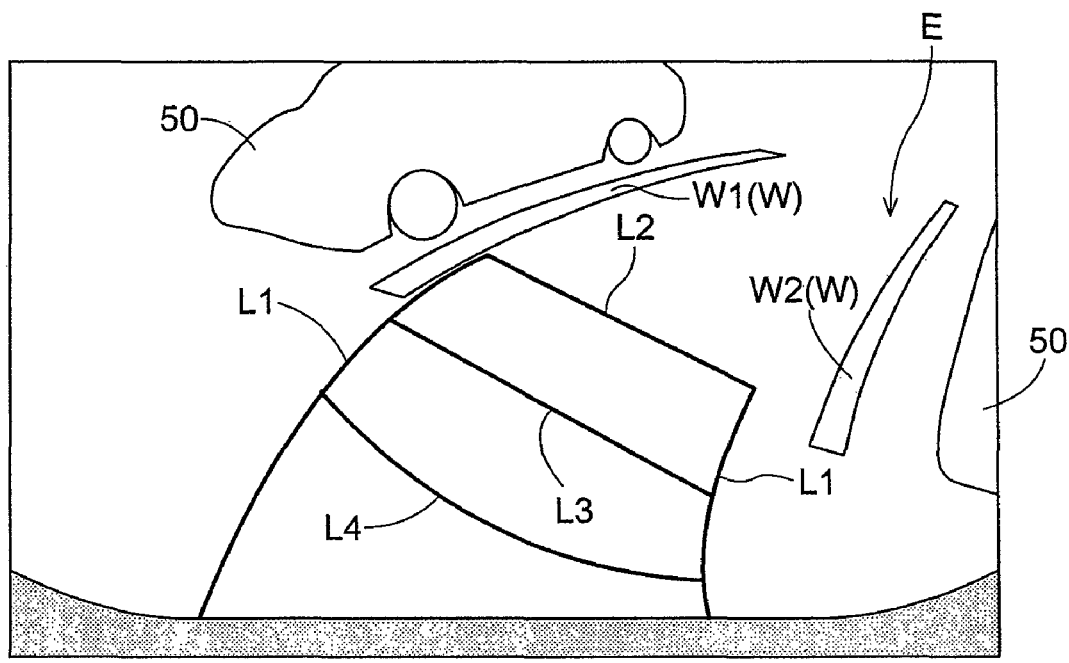
FIG. 19 is an explanatory view (2) showing an example of parking guidance using guidelines.

The guidelines such as the vehicle width extension line L1, will be superposed on the screen, in such a manner to indicate the moving direction of the vehicle 30 according to the steering angle. FIG. 19 shows an example of the screen on the monitor 21 when the steering wheel 39 has been operated.

When it is determined, based on the detection result of the steering sensor 24, that the necessary steering operation has been completed, the guiding section 6 guides:

"Slowly release the brake pedal and move in reverse with the steering wheel fixed, until any further guidance is issued."

If this guidance is followed, the vehicle 30 will move in reverse from the first intermediate position P2 to the second intermediate position P3 shown in FIG. 4, along the arcuate moving path with the left-hand steering (second steering direction) along the second path section K2 of the parking path KB.

Upon arrival of the vehicle 30 at the second intermediate position P3, the guiding section 6 guides, through the speaker 22, "Stop the vehicle once and return the steering wheel to the neutral position."

Upon determination of completion of necessary steering based upon the detection result of the steering sensor 24, the guiding section 6 guides:

"Slowly release the brake pedal and move vehicle straight in reverse with reference to the guideline."

If this guidance is followed, the vehicle 30 will move in reverse from the second intermediate position P3 to the parking target position P4 shown in FIG. 4, along the third path section K3 of the parking path KB. The driver will maneuver the vehicle 30 in reverse with reference to the guidelines L2-L4 in particular, and operate the brake lever 33 at a desired position to stop the vehicle. Incidentally, the stopping position can be guided in voice by the guiding section 6 as described above.

During the above-described guidance, the guiding section 6 will continue calculations of the moving amount and moving direction of the vehicle 30 until the vehicle 30 reaches the parking target position P4 (FIG. 12, #14A, #15A), and assist the maneuvering by means of guideline indication and voice output, etc (#16A). Upon determination of arrival of the vehicle 30 at the parking target position P4 (#17A), as described above, the stopping of the vehicle 30 is assisted by the indication of the guidelines L1-L4 and the voice message. Upon stopping of the vehicle 30, the parking assistance is completed.

Industrial Applicability

As described above, according to the present invention, it has become possible to provide a parking assist system which allows setting of a parking target position and a guiding path for parking with high precision and in a shorter period of time, thus allowing further reduction in the trouble for the driver in parking.

The invention claimed is:

1. A parking assist system for assisting a parking operation of a vehicle including forward movement to a reverse start position and subsequent reverse movement from the reverse start position to park the vehicle at a predetermined parking position, said system comprising:
   an image receiving section for obtaining image data captured by an image capturing device mounted on the vehicle from a scene around the vehicle;
   a parking reference detecting section for repeatedly detecting, based on said image data, a parking reference for use in parking the vehicle, during the forward movement of the vehicle to said reverse start position;
   a parking target setting section for repeatedly setting, based on said parking reference, a parking target position corresponding to said predetermined parking position, during the forward movement of the vehicle to said reverse start position;
   a parking path calculating section for successively calculating a parking path from a current position of the vehicle to said parking target position, based on said parking target positions and said parking references; and
   a parking path determining section for determining whether the parking path has been established effective or not, based upon the result of the calculation by said parking path calculating section,
   wherein a position where the parking path determined by the parking path determining section is established effective is set as the reverse start position.

2. The parking assist system according to claim 1, wherein said parking path calculating section calculates said parking path, each time the vehicle has moved forward by a predetermined distance.

3. The parking assist system according to claim 1, wherein said parking path calculating section calculates said parking path, each time the vehicle has moved for an arc of a predetermined angle.

4. The parking assist system according to claim 1, further comprising an informing outputting section for informing result of determination when it is determined that the parking path has been established effective.

5. The parking assist system according to claim 1, wherein said parking reference comprises a parking space delimiting line.

6. The parking assist system according to claim 1, further comprising:
   an image outputting section for outputting an output image including the scene around the vehicle superposed at least with said parking target position to a display device provided in the interior of the vehicle; and
   an instruction input receiving section for receiving an instruction by the driver of the vehicle;
   wherein said parking target setting section adjusts said parking target position, based upon an instruction inputted by the driver according to said output image.

7. The parking assist system according to claim 1, further comprising a guiding section for guiding the reverse movement of the vehicle from said reverse start position to said parking target position along said parking path.

8. The parking assist system according to claim 7, wherein said guiding section guides the vehicle by an automatic steering control.

9. The parking assist system according to claim 2, further comprising an informing outputting section for informing result of determination when it is determined that the parking path has been established effective.

10. The parking assist system according to claim 3, further comprising an informing outputting section for informing result of determination when it is determined that the parking path has been established effective.

* * * * *